United States Patent
Chen

(10) Patent No.: US 9,102,268 B2
(45) Date of Patent: Aug. 11, 2015

(54) REEL TYPE COLD LIGHT WARNING TRIANGLE

(71) Applicant: Bing-Wei Chen, Chiayi (TW)

(72) Inventor: Bing-Wei Chen, Chiayi (TW)

( * ) Notice: Subject to any disclaimer, the term of this patent is extended or adjusted under 35 U.S.C. 154(b) by 273 days.

(21) Appl. No.: 13/891,494

(22) Filed: May 10, 2013

(65) Prior Publication Data

US 2014/0333427 A1 Nov. 13, 2014

(51) Int. Cl.
| | | |
|---|---|---|
| *B60Q 7/00* | (2006.01) | |
| *G08B 23/00* | (2006.01) | |
| *B60Q 1/26* | (2006.01) | |
| *G08B 5/24* | (2006.01) | |
| *G08B 5/00* | (2006.01) | |
| *G08G 1/095* | (2006.01) | |
| *B60Q 1/46* | (2006.01) | |
| *B60Q 1/50* | (2006.01) | |
| *B60Q 7/02* | (2006.01) | |
| *B60Q 1/52* | (2006.01) | |
| *F21V 21/005* | (2006.01) | |
| *F21Y 105/00* | (2006.01) | |
| *F24C 3/14* | (2006.01) | |
| *G06F 1/16* | (2006.01) | |

(52) U.S. Cl.
CPC .............. *B60Q 1/46* (2013.01); *B60Q 1/2611* (2013.01); *B60Q 1/50* (2013.01); *B60Q 1/503* (2013.01); *B60Q 1/525* (2013.01); *B60Q 7/005* (2013.01); *B60Q 7/02* (2013.01); *F21V 21/005* (2013.01); *F21Y 2105/001* (2013.01); *F24C 3/14* (2013.01); *G06F 1/1616* (2013.01)

(58) Field of Classification Search
CPC .............. B60Q 1/00; B60Q 7/00; B60Q 1/50; B60Q 1/503; B60Q 1/525; B60Q 1/486; B60Q 1/46; B60Q 1/2611; B60Q 7/02; B60Q 7/005; F21V 21/14; F21V 21/005; F21V 31/005; F21V 23/06; F21V 17/007; F21V 21/08; F24C 3/14; G06F 1/1616; G09F 13/00; F21Y 2101/02; F21Y 2105/003; F21Y 2105/001; F21L 2001/00; F21L 4/08
USPC ......... 340/468, 469, 473, 471, 472, 474, 478, 340/482, 484, 481, 489, 321, 326, 331, 332, 340/333, 815.4–815.92, 915, 908, 907, 340/908.1

See application file for complete search history.

(56) References Cited

U.S. PATENT DOCUMENTS

| | | | | |
|---|---|---|---|---|
| 4,875,028 | A | * | 10/1989 | Chou ............................ 340/473 |
| 5,970,639 | A | * | 10/1999 | Hui ................................ 40/610 |
| 5,979,847 | A | * | 11/1999 | Williams et al. .............. 248/200 |

(Continued)

*Primary Examiner* — Daniell L Negron
*Assistant Examiner* — Mancil Littlejohn, Jr.
(74) *Attorney, Agent, or Firm* — Patent Office of Bang Shia

(57) ABSTRACT

A reel type cold light warning triangle includes a base, two support members, a cold light reel assembly, an elastic return assembly, two support units, a pulling member, a power system and a control assembly. The cold light warning piece can be pulled out or rolled up automatically simply by pulling or pushing the pulling member without using any assembling or disassembling tools, which is very convenient. Furthermore, the base provides stable support for the reel type cold light warning triangle. On top of that, the warning triangle is provided with the power system which can generate enough power to satisfy the power consumption of the cold light warning triangle, and the vehicle-electric-appliance plug can supply power from vehicle to the cold light warning triangle if the power system cannot generate enough power.

10 Claims, 6 Drawing Sheets

(56) References Cited

U.S. PATENT DOCUMENTS

| | | | |
|---|---|---|---|
| 7,158,020 B2* | 1/2007 | Grady, Jr. | 340/473 |
| 7,395,776 B2* | 7/2008 | Harruna | 116/28 R |
| 2002/0062780 A1* | 5/2002 | Chen | 116/63 P |
| 2005/0081413 A1* | 4/2005 | Ko | 40/514 |
| 2005/0220537 A1* | 10/2005 | Bentley | 404/9 |

* cited by examiner

REEL TYPE COLD LIGHT WARNING TRIANGLE

BACKGROUND OF THE INVENTION

1. Field of the Invention

The present invention relates to a warning device used on a vehicle, and more particularly to a reel type cold light warning triangle.

2. Description of the Prior Art

A conventional warning triangle 10, as shown in FIG. 1, comprises a triangle piece 11 coated with a reflective sticker and a foldable leg 12 coupled to the triangle piece 11. The conventional warning triangle 10 itself cannot produce warning light and is only able to reflect light projecting onto the warning triangle 10, which means that the warning triangle 10 can be seen in darkness and serves as a warning only when there is a light projecting onto the warning triangle.

Besides, the structure of the triangle piece 11 and the leg 12 are too thin and not strong enough to make the warning triangle 10 stand firmly on the road, especially when there is strong wind or vehicle passing by at high speed. Under this circumstance, the warning triangle 10 is very likely to fall down, and it will be very dangerous when the vehicles coming from behind cannot see the warning triangle 10.

The present invention has arisen to mitigate and/or obviate the afore-described disadvantages.

SUMMARY OF THE INVENTION

The primary objective of the present invention is to provide a reel type cold light warning triangle which is capable of overcoming the disadvantage of the conventional warning triangle that the conventional warning triangle cannot be well positioned and the warning effect is not good.

To achieve the above objective, a reel type cold light warning triangle in accordance with the present invention comprises:

A base with an assembling chamber and an opening in communication with the assembling chamber;

A cold light reel assembly including a rotary shaft and a cold light warning piece which is a triangle structure with a plurality of wind apertures, the cold light warning piece being provided at one end thereof with an assembling portion and having an assembling edge which is fixed to and winds around the rotary shaft, the rotary shaft extending in a first direction and being received in the assembling chamber, and a direction perpendicular to the first direction being defined as a second direction;

An elastic return assembly including a side cover and a coil spring, the coil spring being sleeved on the rotary shaft and having two ends fixed to the rotary shaft and the side cover, respectively, the side cover being fixed to the base;

Two support units each including a hollow cylinder, a spring and a rod, each of the cylinders being provided on an inner surface thereof with a first annular flange and a second annular flange which are located at two ends of the cylinder, the spring and the rod being received in the hollow cylinder, the rods each having a push portion at one end and a connecting portion at another end, the push portion being made of elastic material, the springs each having two ends fixed to the cylinders and the push portions of the rods, respectively, the rods being slidably received in the cylinders and the connecting portions extending out of the cylinders, the two cylinders being pivoted at two sides of the base and pivotable around the second direction, and the connecting portions of the cylinders being pivoted to each other, under normal conditions, the springs of the support units being compressed to pull the rods, making the push portions stop against the first annular flange;

A pulling member having a connecting end inserted in the assembling chamber via the opening and pivoted to the connecting portions of the cylinders and the assembling portion of the cold light reel assembly and having a pulling end stopped against an outer periphery of the opening of the base;

A power system being electrically connected and supplying power to the cold light warning piece; and A control assembly including a control unit electrically connected to the power storage unit and a plurality of control buttons electrically connected to the control unit.

DETAILED DESCRIPTION OF THE PREFERRED EMBODIMENTS

Figure 1:
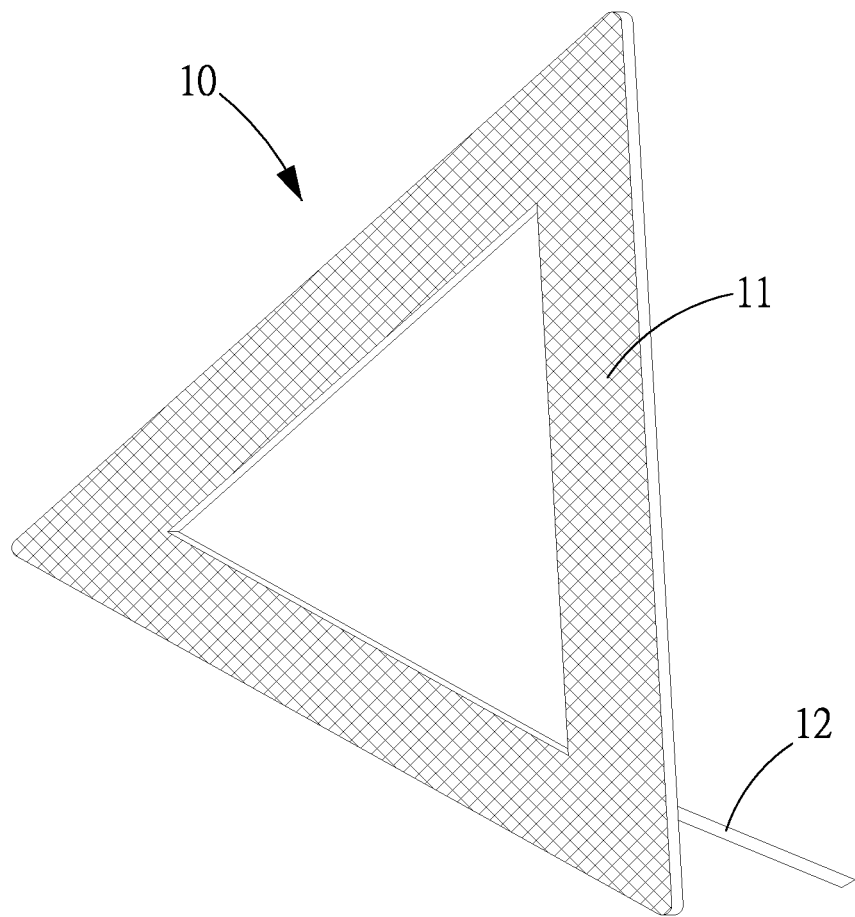
FIG. 1 shows a conventional warning triangle.

The present invention will be clearer from the following description when viewed together with the accompanying drawings, which show, for purpose of illustrations only, the preferred embodiment in accordance with the present invention.

Referring to FIGS. 2-6, a reel type cold light warning triangle in accordance with the present invention comprises: a base 20, two support members 30, a cold light reel assembly 40, an elastic return assembly 50, two support units 60, a pulling member 70, a power system 80 and a control assembly 90.

The base 20 includes an assembling chamber 21, an opening 22 in communication with the assembling chamber 21, and a beeper 23 mounted on the base 20.

The two support members 30 are oppositely disposed at two sides of the assembling chamber 21 of the base 20 and each have a pivot hole 31 for holding a bearing 311. A direction extending between the two pivot holes 31 is defined as a first direction D1, and a direction perpendicular to the first direction D1 is defined as a second direction D2. Each of the support members 30 is further formed with a pivot groove 32 in which being disposed a pivot 33 which extends along the second direction D2.

The cold light reel assembly 40 includes a rotary shaft 41 and a cold light warning piece 42 which is a triangle structure with a plurality of wind apertures 421. The cold light warning piece 42 is provided at one end thereof with an assembling portion 422 and has an assembling edge 423 which is fixed to and winds around the rotary shaft 41. The rotary shaft 41 has two ends inserted in the bearings 311 of the support members 30 received in the assembling chamber 21, so that the rotary shaft 41 is received in the assembling chamber 21 and pivoted to the pivot hoes 31 in such a manner that the rotary shaft 41 extends along the first direction D1, and the two ends of the rotary shaft 41 protrude out of the corresponding bearing 311. The two sides of the cold light warning piece 42 can be provided with different colored cold light emitting members.

The elastic return assembly 50 includes a side cover 51 and a coil spring 52. The coil spring 52 is sleeved on one of the two ends of the rotary shaft 41 and has two ends fixed to the rotary shaft 41 and the side cover 51, respectively. The side cover 51 is fixed to the pivot hole 31 of the bearing 311.

Figure 3:
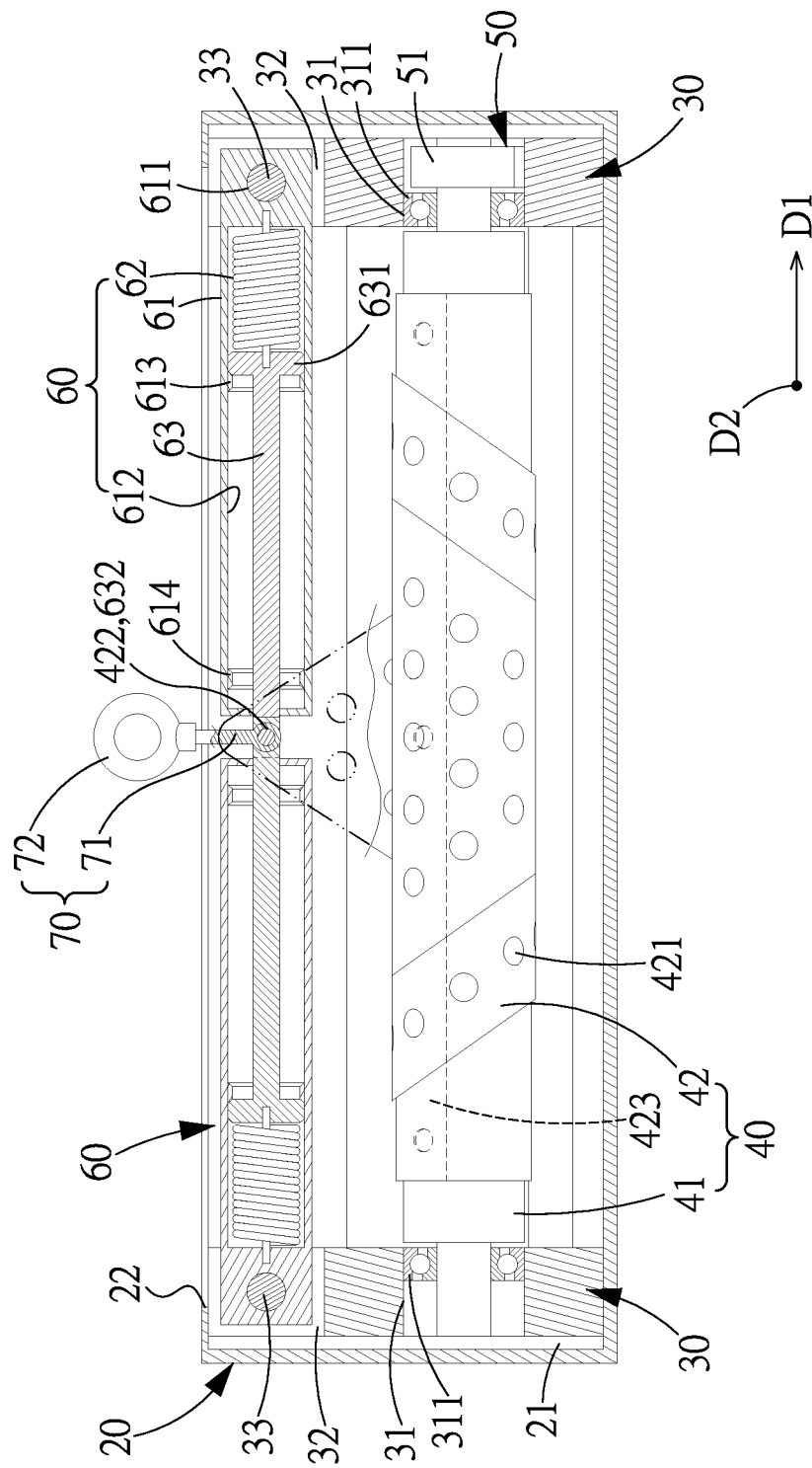
FIG. 3 is a cross sectional view of a part of the reel type cold light warning triangle in accordance with the present invention, wherein the warning triangle is rolled up.

Each of the support units 60 includes a hollow cylinder 61 with a connecting hole 611 at one end thereof, a spring 62 and a rod 63 which are disposed in the hollow cylinder 61. Each of the cylinders 61 is provided on an inner surface 612 thereof with a first annular flange 613 and a second annular flange 614 which are located at two ends of the cylinder 61. The rods 63 each have a push portion 631 at one end and a connecting portion 632 at the other. The push portion 631 is made of elastic material (such as rubber) and is configured to fit in the cylinder 61. The springs 62 each have two ends fixed to the cylinders 61 and the push portions 631 of the rods 63, respectively. The rods 63 are slidably received in the cylinders 61 and the connecting portions 632 extend out of the cylinders 61. Each of the cylinders 61 is pivoted to the support members 30 by inserting the pivots 33 into the connecting holes 611, so that the two cylinders 61 are pivoted at two sides of the base 20 and pivotable around the second direction D2, and the connecting portions 632 of the cylinders 61 are pivoted to each other. Under normal conditions, as shown in FIG. 3, the springs 62 of the support units 60 are compressed to pull the rods 63, making the push portions 631 stop against the first annular flange 613, and the two cylinders 61 are in a straight line to each other.

The pulling member 70 includes a connecting end 71 and a pulling end 72. The connecting end 71 is inserted in the assembling chamber 21 via the opening 22 and pivoted to the connecting portions 632 of the cylinders 61 and the assembling portion 422 of the cold light reel assembly 40. The pulling end 72 is stopped against the outer periphery of the opening 22 of the base 20. The cold light warning piece 42 of the cold light reel assembly 40 is partially connected to the two cylinders 61.

The power system 80 is electrically connected and supplies power to the cold light warning piece 42 and comprises: an electric power processing unit 81, a solar energy generating unit 82, a wind power generating unit 83, a power storage unit 84 and a vehicle-electric-appliance plug 85. The power storage unit 84 is electrically connected to and supply power to the cold light warning piece 42 and the beeper 23. The electric power processing unit 81 takes the form of a voltage transformer and current regulator serving to change the voltage and regulate the current. The solar energy generating unit 82 includes a plurality of solar panels 821 which are disposed on the base 20 and electrically connected to the electric power processing unit 81, so that the electric power generated by the solar panels 821 can be stored in the power storage unit 84. The wind power generating unit 83 includes a fan 831 disposed on the base 20 and electrically connected to the electric power processing unit 81, so that the electric power generated by the fan 831 can be stored in the power storage unit 84 via the electric power processing unit 81. The vehicle-electric-appliance plug 85 is electrically connected to the electric power processing unit 81, so that vehicle electric appliance is electrically connected to the power storage unit 84 via the electric power processing unit 81. The vehicle-electric-appliance plug 85 is a car cigarette lighter.

The control assembly 90 includes a control unit 91 electrically connected to the power storage unit 84 and a plurality of control buttons 92 electrically connected to the control unit 91.

Figure 2:
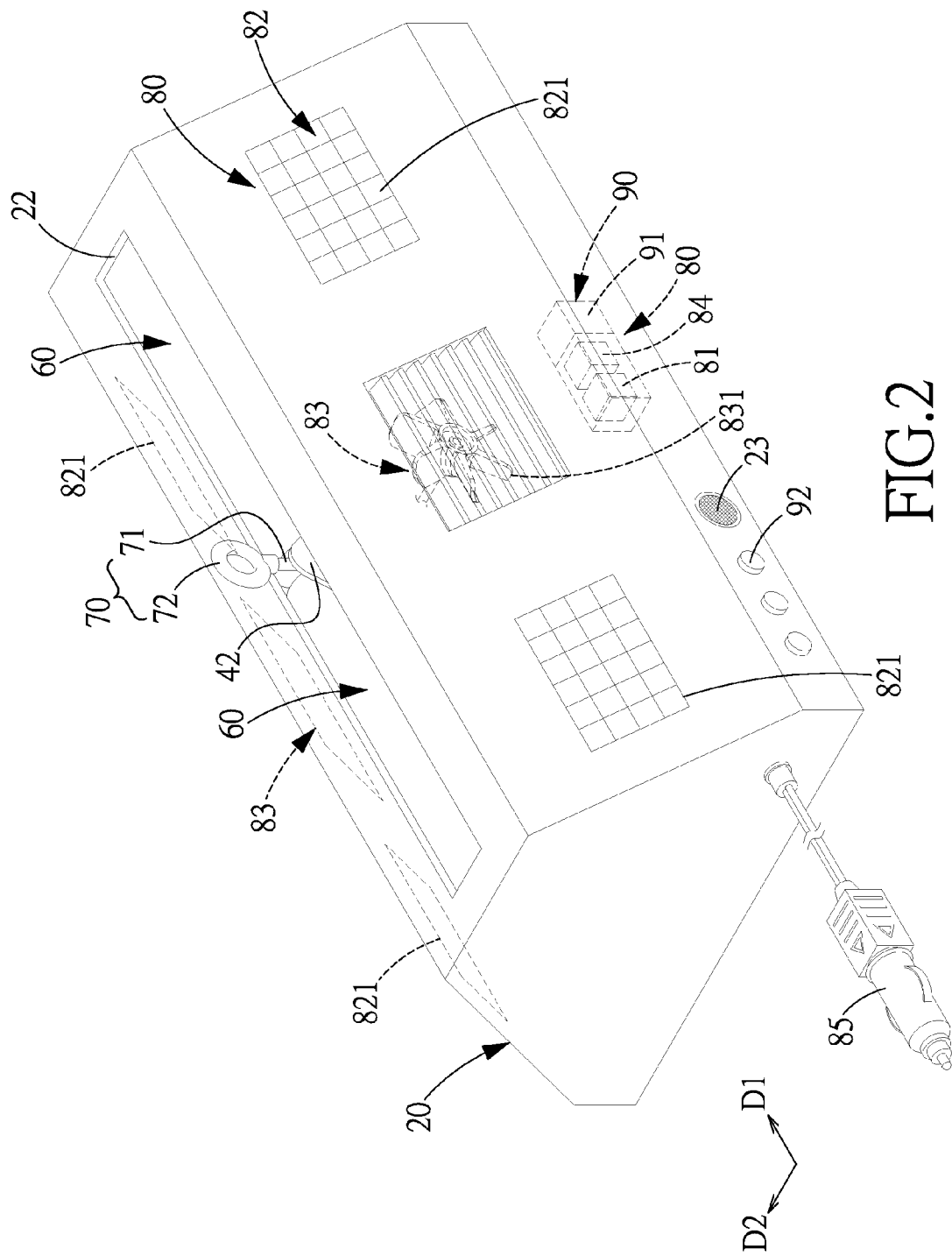
FIG. 2 is a perspective view showing a reel type cold light warning triangle in accordance with the present invention.
Figure 4:
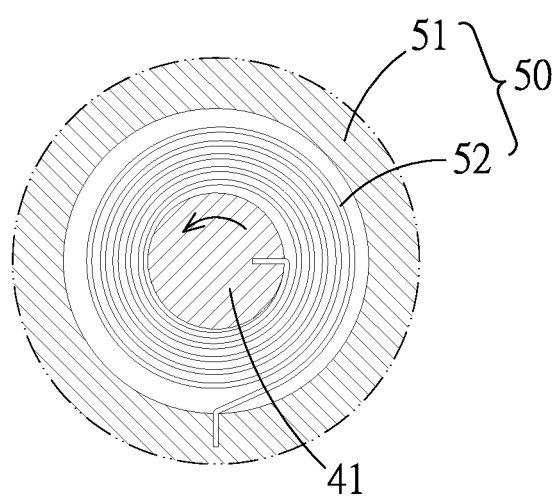
FIG. 4 is a cross sectional view of a part of the reel type cold light warning triangle in accordance with the present invention, wherein the coil spring is in a released state.

When the reel type cold light warning triangle in accordance with the present invention is not in use, as shown in FIGS. 2-4, the cold light warning piece 42 of the cold light reel assembly 40 is wound around the rotary shaft 41 and partially connected to the support units 60, the coil spring 52 of the elastic return assembly 50 is in a relaxed position, while the springs 62 of the support units 60 are compressed to pull the rods 63 into the hollow cylinders 61 in such a manner that the push portions 631 of the rods 63 are locked in a first locked position by leaning against the first annular flanges 613 of the hollow cylinders 61.

Figure 5:
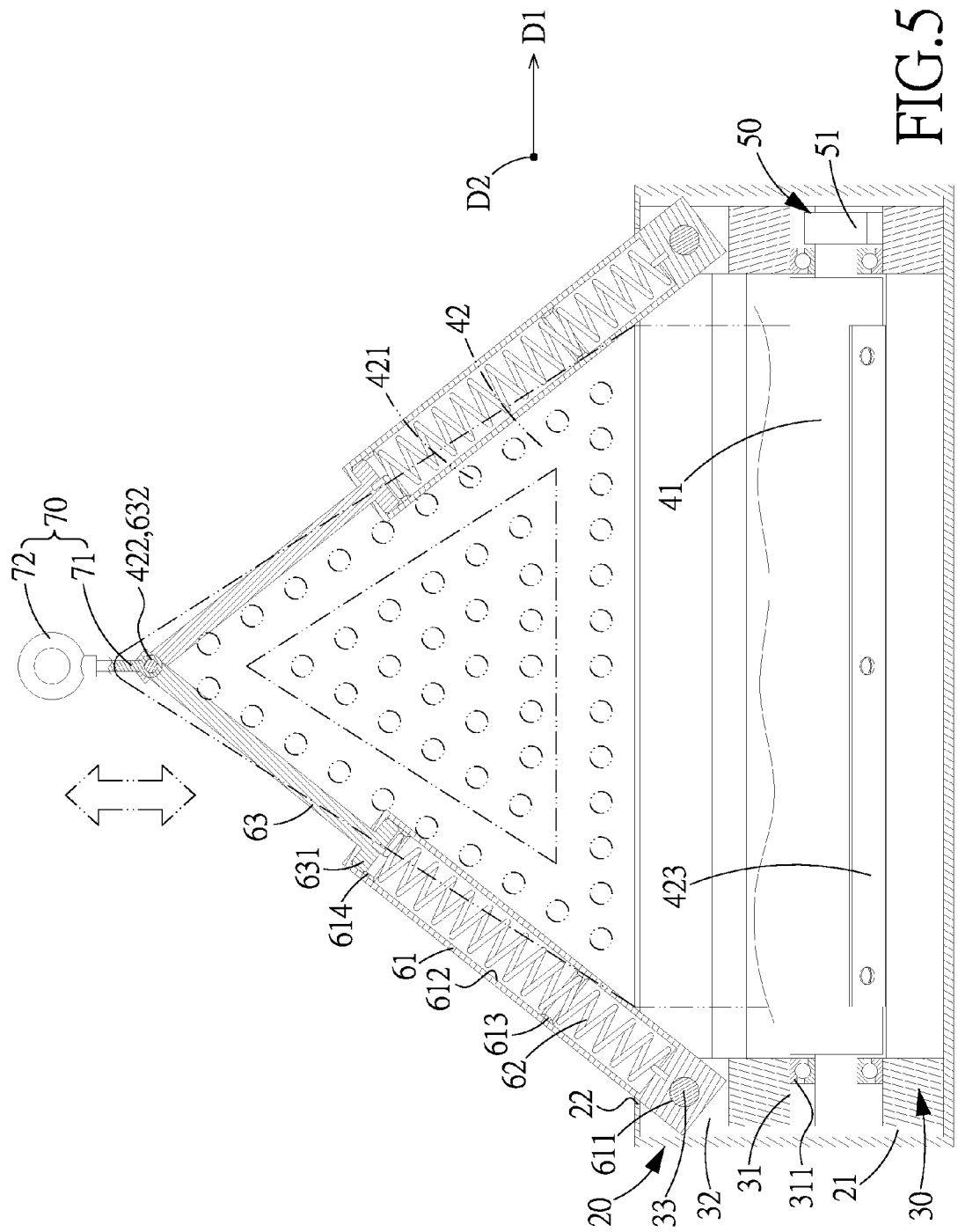
FIG. 5 is a cross sectional view of the reel type cold light warning triangle in accordance with the present invention, wherein the warning triangle is pulled out.
Figure 6:
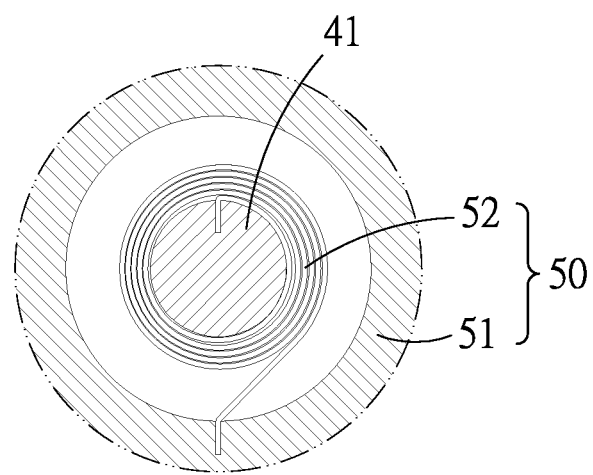
FIG. 6 is a cross sectional view of a part of the reel type cold light warning triangle in accordance with the present invention, wherein the coil spring is rolled up.

To pull out the cold light warning piece 42, the user needs to pull the pulling end 72 of the pulling member 70 to make the connecting end 71 pull the rods 63 of the support units 60, so that the rods 63 will be deformed to pass over the first annular flange 613 and released from the locked position. Then, keeping pulling the rods 63 can make the rods 63 slide out of the hollow cylinders 61 and make the rods 63 pivot around the connecting holes 611, so that the cold light warning piece 42 will be pulled out from the rotary shaft 41 and cause the rotary shaft 41 to rotate. Meanwhile, the rotation of the rotary shaft 41 will cause compression of the coil spring 52, as shown in FIG. 6. When the user continues to pull the rods 63 with the pulling member 70, the push portions 631 of the rods 63 will be deformed to pass over the second annular flange 614, and then, if the user stops pulling the pulling member 70, the push portions 631 of the rods 63 will be locked in a second locked position by leaning against the second annular flange 614, as shown in FIG. 5.

After the cold light warning piece 42 is pulled out, the user can choose to switch on the beeper 23 or cold light source of the cold light warning piece 42 by using the control buttons 92, providing different options to warn the vehicles behind. Furthermore, since the base 20 provides stable support for the reel type cold light warning triangle, the cold light warning triangle of the present invention can stand stably on the road without the use of other assembling tools.

When there is strong wind or vehicle passing by at high speed, the wind apertures 421 can reduce the wind pressure on the cold light warning piece 42, which improves the stability of the warning triangle. Furthermore, two anti-leak rubber pieces can be provided at two sides of the opening 22 to prevent water falling into the assembling chamber 21 in such a manner that the anti-leak rubber pieces each have one end fixed to the edge of the opening 22, and another ends of the anti-leak rubber pieces are overlapped.

The solar energy generating unit 82 and the wind power generating unit 83 can generate enough power to satisfy the power consumption of the cold light warning triangle of the present invention, and the vehicle-electric-appliance plug 85 can supply power from vehicle to the cold light warning triangle of the present invention if the solar energy generating unit 82 and the wind power generating unit 83 cannot generate enough power.

The present invention is easy to put away when not in use, the user only needs to push the pulling member 70 downward, which will cause the push portions 631 of the rods 63 to deform and pass over the second annular flange 614, and the rods 63 will be released from the second locked position and pulled quickly back into the hollow cylinders 61 by the springs 62. Then the user just needs to slightly press the pulling member 70 when the rods 63 approach the first annular flange 613, the push portions 631 of the rods 63 will be deformed to pass over the first annular flange 613 and locked into the first locked positioned again. Meanwhile, the coil spring 52 will be decompressed to rotate the rotary shaft 41, as a result, the cold light warning piece 42 will be wound around the rotary shaft 41 automatically.

It is clear from the above description that the cold light warning piece 42 of the present invention can be pulled out or rolled up automatically simply by pulling or pushing the pulling member 70 without using any assembling or disassembling tools, which is very convenient. Furthermore, the base 20 provides stable support for the reel type cold light warning triangle. On top of that, the present invention is provided with the power system 80 which can generate enough power to satisfy the power consumption of the cold light warning triangle of the present invention, and the vehicle-electric-appliance plug 85 can supply power from vehicle to the cold light warning triangle of the present invention if the power system 80 cannot generate enough power.

While we have shown and described various embodiments in accordance with the present invention, it is clear to those skilled in the art that further embodiments may be made without departing from the scope of the present invention.

What is claimed is:

1. A reel type cold light warning triangle comprising:
a base with an assembling chamber and an opening in communication with the assembling chamber;
a cold light reel assembly including a rotary shaft and a cold light warning piece which is a triangle structure with a plurality of wind apertures, the cold light warning piece being provided at one end thereof with an assembling portion and having an assembling edge which is fixed to and winds around the rotary shaft, the rotary shaft extending in a first direction and being received in the assembling chamber, and a direction perpendicular to the first direction being defined as a second direction;
an elastic return assembly including a side cover and a coil spring, the coil spring being sleeved on the rotary shaft and having two ends fixed to the rotary shaft and the side cover, respectively, the side cover being fixed to the base;
two support units each including a hollow cylinder, a spring and a rod, each of the cylinders being provided on an inner surface thereof with a first annular flange and a second annular flange which are located at two ends of the cylinder, the spring and the rod being received in the hollow cylinder, the rods each having a push portion at one end and a connecting portion at another end, the push portion being made of elastic material, the springs each having two ends fixed to the cylinders and the push portions of the rods, respectively, the rods being slidably received in the cylinders and the connecting portions extending out of the cylinders, the two cylinders being pivoted at two sides of the base and pivotable around the second direction, and the connecting portions of the cylinders being pivoted to each other, under normal conditions, the springs of the support units being compressed to pull the rods, making the push portions stop against the first annular flange;
a pulling member having a connecting end inserted in the assembling chamber via the opening and pivoted to the connecting portions of the cylinders and the assembling portion of the cold light reel assembly and having a pulling end stopped against an outer periphery of the opening of the base;
a power system being electrically connected and supplying power to the cold light warning piece; and
a control assembly including a control unit electrically connected to the power storage unit and a plurality of control buttons electrically connected to the control unit.

2. The reel type cold light warning triangle as claimed in claim 1, wherein two support members are oppositely disposed at two sides of the assembling chamber of the base and each have a pivot hole for insertion of two ends of the rotary shaft.

3. The reel type cold light warning triangle as claimed in claim 2, wherein a bearing is disposed in each of the pivot holes, and the two ends of the rotary shaft are inserted in the bearings.

4. The reel type cold light warning triangle as claimed in claim 1, wherein two support members are oppositely disposed at two sides of the assembling chamber of the base and each have a pivot groove in which being disposed a pivot which extends along the second direction, each of the hollow cylinders is provided at one end thereof with a connecting hole, and the cylinders are pivoted to the support members by inserting the pivots into the connecting holes.

5. The reel type cold light warning triangle as claimed in claim 1, wherein two support members are oppositely disposed at two sides of the assembling chamber of the base and each have a pivot hole for insertion of two ends of the rotary shaft, the two ends of the rotary shaft protrude out of the bearings, and the side cover is fixed to the pivot holes.

6. The reel type cold light warning triangle as claimed in claim 1, wherein the power system comprises an electric power processing unit and a power storage unit which is electrically connected to the cold light warning piece and the beeper, and the electric power processing unit serves to change voltage and regulate current.

7. The reel type cold light warning triangle as claimed in claim 1, wherein the power system comprises an electric power processing unit and a power storage unit, a beeper is mounted on the base, the control assembly is electrically connected to the power storage unit, and the power storage unit is electrically connected to the beeper.

8. The reel type cold light warning triangle as claimed in claim 1, wherein the power system comprises an electric power processing unit, a solar energy generating unit, and a power storage unit, the solar energy generating unit includes a plurality of solar panels which are disposed on the base and electrically connected to the electric power processing unit, so that the electric power generated by the solar panels is stored in the power storage unit.

9. The reel type cold light warning triangle as claimed in claim 1, wherein the power system comprises an electric power processing unit, a solar energy generating unit, and a power storage unit, the wind power generating unit includes a fan disposed on the base and electrically connected to the electric power processing unit, so that the electric power generated by the fan is stored in the power storage unit via the electric power processing unit.

10. The reel type cold light warning triangle as claimed in claim 1, wherein the power system comprises an electric power processing unit and a power storage unit, on the base is provided a vehicle-electric-appliance plug which is electrically connected to the electric power processing unit, so that an vehicle electric appliance is electrically connected to the power storage unit via the electric power processing unit, and the vehicle-electric-appliance plug is a car cigarette lighter.

* * * * *